(12) United States Patent
Frederick

(10) Patent No.: US 6,325,460 B1
(45) Date of Patent: Dec. 4, 2001

(54) MACHINE USED IN CONNECTION WITH UNDERGROUND MINING HAVING AN OPERATOR PROTECTIVE SHIELD

(75) Inventor: John R. Frederick, Polk, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 09/493,976

(22) Filed: Jan. 28, 2000

(51) Int. Cl.⁷ ................................................. E21C 35/04
(52) U.S. Cl. ................................ 299/95; 299/12; 299/29; 405/291
(58) Field of Search ........................... 299/11, 12, 33, 299/95, 29; 405/291, 292, 293, 294, 295, 296, 297, 298, 299, 300, 301, 302; 296/84.1, 95.1; 280/748; 180/89.13

(56) References Cited

U.S. PATENT DOCUMENTS 3,943,723 * 3/1976 Evans et al. ...................... 405/291
4,290,490 * 9/1981 Barthe et al. ...................... 299/33
4,531,776 * 7/1985 Laws et al. ...................... 180/89.13

OTHER PUBLICATIONS

Alpine Breaker Line Support operator's manual, selected pages; Voest–Alpine Bergtechnik; 1996.*

* cited by examiner

*Primary Examiner*—David Bagnell
*Assistant Examiner*—John Kreck

(57) ABSTRACT

A protective shield for machines having an operator station protects an operator located on the operator station during operation of the machine. The protective shield defines a flexible curtain of elongated members which covers an exposed side of the operator station, but yet is also of a construction that allows the operator to reach and see through the curtain when desired. The protective shield has an adjustable height to accommodate a variety of machines and to adjust to underground mines having different sizes and shapes. The protective shield is easily removable from and reattachable to machines without the use of additional tools, thereby enhancing its versatility and usefulness. In a preferred embodiment, the protective shield comprises a somewhat stretchable chain mesh, which hangs from a roof canopy extending along side the operator station.

21 Claims, 2 Drawing Sheets

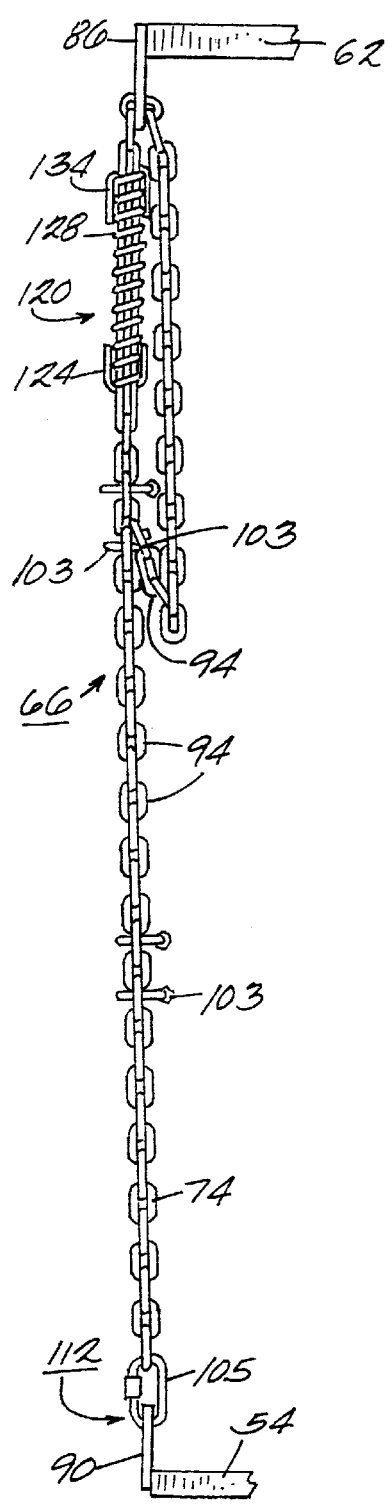
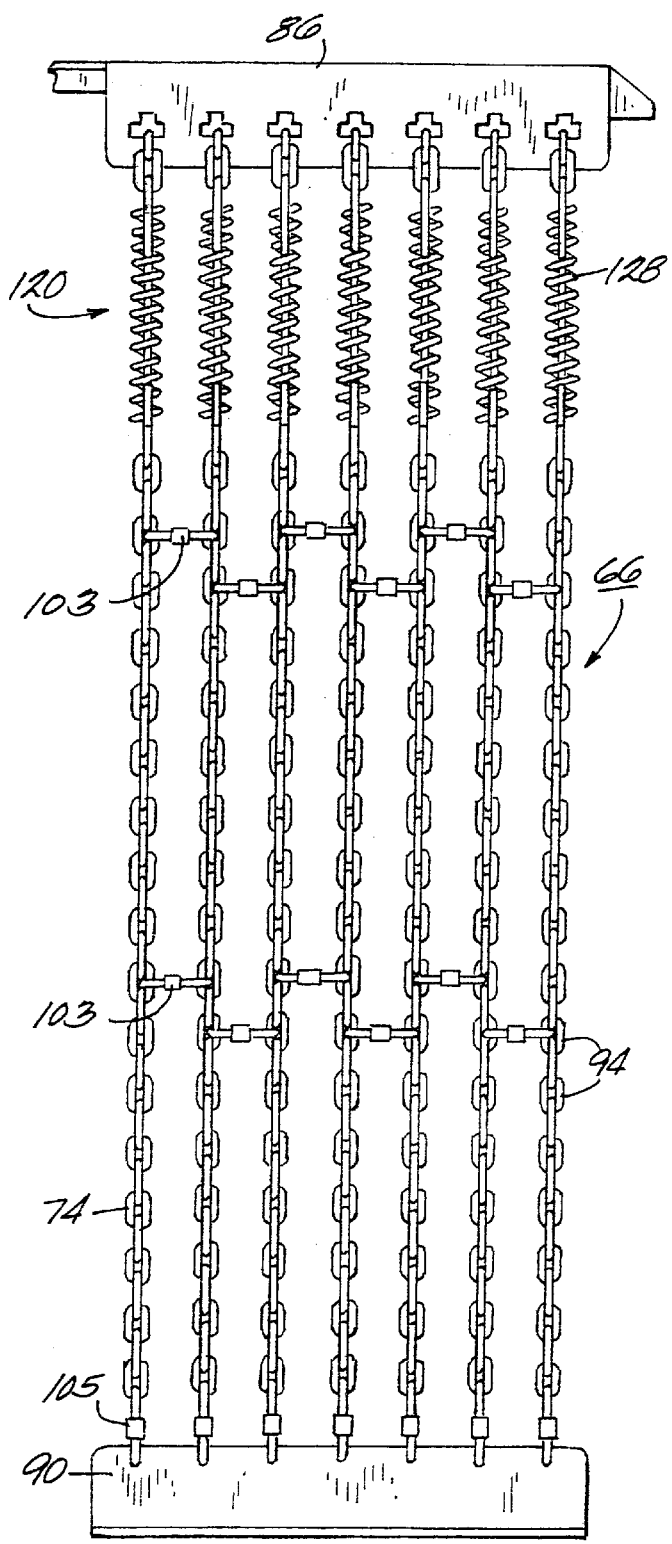
Fig. 3a
Fig. 3b

MACHINE USED IN CONNECTION WITH UNDERGROUND MINING HAVING AN OPERATOR PROTECTIVE SHIELD

FIELD OF THE INVENTION

The present invention relates to machines used in connection with underground mining, and more particularly, to machines having an operator station for supporting an operator. Specifically, the present invention relates to a protective device to protect the operator during operation of a machine.

BACKGROUND OF THE INVENTION

There are many known machines used in connection with underground mining for coring, drilling, mining, or the like. One particular type of machine used in connection with underground mining is commonly referred to as a bolting apparatus. An example of one such bolting apparatus is described in PCT International Application No. PCT/AU99/00014 (WO 99/36671), which is incorporated herein by reference. As can be appreciated by those skilled in the art, underground mining involves the need to prevent the collapsing of overhead ceilings or roofs and side walls or ribs of underground mines in order to prevent injury to personnel and damage to mining equipment. Roof bolting and rib bolting are those processes that secure the roofs and sidewalls of underground mines to other stable strata. Generally, bolting apparatuses include an operator station for supporting one or more operators during operation of the machine. The operator station typically serves to define a support platform upon which the operating personnel can stand and walk as needed Some machines include adjustable platforms or deck extensions so as to increase the size of the operator working station.

It is also known to provide machines used in connection with underground mining with a roof canopy in order to cover the operator station so as to protect the operator from debris or the like which may fall from an entry roof of an underground mine. It is also known to provide machines with vertically extending rigid steel rib components adjacent to the operator station so as to protect the operator from material which may fall from the walls of the mine.

Bolting apparatuses generally follow continuous mining equipment that advances into an underground seam and, as material is won therefrom, an entry or opening is formed in the underground seam. The size of the entry is dependent at least in part on the type and size of the continuous mining equipment used to cut the entry. Although the known vertically extending rigid steel rib components are capable of protecting an operator during operation of the machine, their usefulness is limited because they are not adjustable to accommodate the various different types of machines having various sizes, nor are they adjustable to accommodate changes in the size and shape of the entry of an underground mine. As known, the overall height of an operator station may vary depending on the size and shape of the entry formed in an underground mine. The known vertically extending rigid steel rib components are not particularly suitable for use with machines used in connection with underground mining of varying types and sizes, nor are they particularly suitable for use in those situations where the size and shape of the entry of an underground mine changes, because the nonadjustable rigid rib components may limit the location of a roof canopy with respect to an operator platform, may limit the height range on the folding deck extensions if such extensions are utilized, and may not provide full height protection for an operator. Another problem with the known rigid rib components is that the inflexibility of the rigid ribs makes it somewhat difficult for personnel to reach through the rigid ribs, thereby adversely affecting the overall efficiency of the underground mining operation. It was also not possible to temporarily remove the rigid ribs should the operator need to access the side of the machine.

SUMMARY OF THE INVENTION

The invention provides a protective shield that substantially covers an exposed side of the operator station to protect the operator during operation of the machine. The protective shield solves the above noted problems and other problems of the prior art. More particularly, the invention provides an adjustable protective shield, which is usable with different types of machines having various sizes. The shield is adjustable to accommodate various changes in the size and shape of the entry of an underground mine to better protect the operator during operation of the machine. The shield is also flexible and is easy to handle and is removable from and reattachable to the same machine or a variety of different machines, if desired One of the principal features of the protective shield is that it is adjustable to cover the exposed side of the operator station with no particular regard to the height of the exposed side of the operator station as such may change from time to time. Another feature of the protective shield is that it is flexible to allow the operator to easily reach around and see through the shield, as needed. Another feature of the protective shield is that it is easily and efficiently removable from and reattachable to the same or multiple machines all without the use of additional tools. Another feature of the protective shield is that it has a somewhat elastic nature.

Preferably, the protective shield includes a set of elongated members. The set of elongated members defines a flexible curtain, which advantageously enables the operator to reach and see through, but which also, at the same time, protects the operator from harm from flying debris or the like. In a preferred embodiment, the elongated members are chains such that the protective shield comprises a chain mesh extending between the canopy and the operator-working platform. Preferably, the roof canopy is designed to support the protective shield such that the protective shield is suspended from the canopy, thereby substantially covering an exposed side of the operator station. In a preferred embodiment, each chain includes an extension spring for additional flexibility as needed.

Other features and advantages of the invention will become apparent to those skilled in the art upon review of the following detailed description, claims and drawings in which like numerals are used to designate like features.

BRIEF DESCRIPTION OF THE DRAWINGS

FIG. 3a is an enlarged portion of FIG. 2 illustrating a protective shield according to the present invention.

FIG. 3b is a side elevational view of the protective shield as shown in FIG. 3a.

Figure 1:
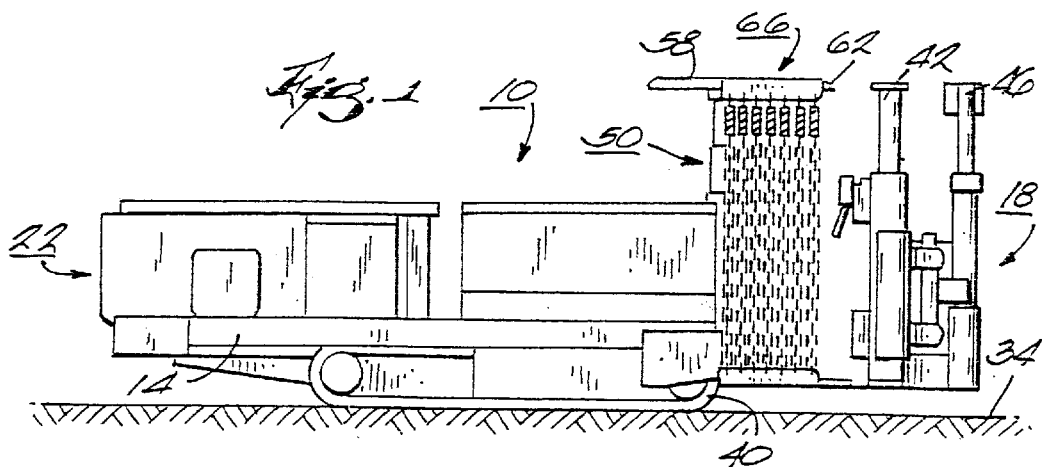
FIG. 1 is a side elevational view of a machine used in connection with underground mining embodying the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof.

DESCRIPTION OF THE PREFERRED EMBODIMENT

Figure 2:
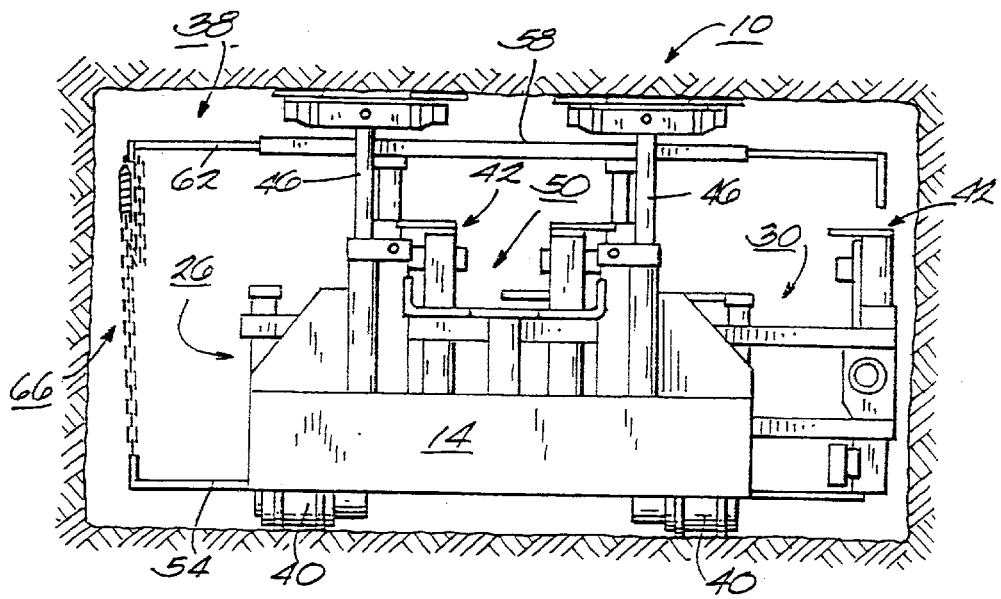
FIG. 2 is a front elevational view of the machine of FIG. 1.

Illustrated in FIGS. 1 and 2 is a machine 10 embodying the invention. The depicted machine is used in connection with underground mining and is referred to as a bolting apparatus. It should be understood that the present invention is capable of use in other machines known in the art and the bolting apparatus is merely shown and described as an example of one such machine.

The machine 10 includes a frame 14 having a front end 18, a back end 22 and lateral sides 26 and 30. The frame 14 is supported for movement over the ground or floor 34 of an entry or opening 38 by track units 40, which may be crawler tracks. In other embodiments, other means of moving the frame 14 may be used. At least one bolter 42 is operatively mounted to the front end 18 of the frame 14. At least one roof support 46 including an upwardly extending roof engaging member and a downwardly extending floor engaging member is operatively attached to the front end 18 of the frame 14 apart from the bolter 42. An operator station 50 having at least one exposed side on the frame 14 supports an operator during operation of the machine 10. Deck extensions 54 increase the size of the platform 50 upon which the operator can stand and walk. In other embodiments, deck extensions may not be used. A canopy 58 supported by the frame 14 extends over the operator station 50. The canopy 58 includes a canopy extension 62 to allow the canopy 58 to extend over the deck extensions 54 when the deck extensions 54 are utilized.

Bolting apparatuses, such as the bolting apparatus 10 shown in FIGS. 1 and 2, generally operate as follows. Typically, after a mining machine, such as a continuous miner, has formed an appropriate entry extension or opening into an underground seam, the mining process is interrupted and the mining machine and any supporting conveying apparatus for the won material is moved to allow the bolting apparatus to be driven into the entry. Generally, one or two operators control the bolting apparatus. The mobile bolting apparatus is driven to a point where it is located directly beneath a portion of an entry roof that is to be bolted. Thereafter, the roof supports are extended to engage the roof of the entry and the floor of the entry to provide load-bearing columns between the roof and the floor. After the roof supports are extended in this manner, the bolting process can begin. A roof canopy is usually provided to protect the operator from material that may fall from the entry roof. The operator is free to move about the operator station so as to control the operation of the bolting apparatus. At least one bolter is activated to install bolts in the entry roof in a conventional manner. After the bolts have been installed and the bolter is returned to its inactivated position, the roof supports are retracted to permit the mobile bolting apparatus to be driven forward to the next position where additional bolts are to be installed.

The construction and operation of the bolting apparatus 10 has not been shown and described in great detail because the construction and operation thereof is not significant in terms of the present invention. For a more complete description of a bolting apparatus, see the previously mentioned PCT Application that has been incorporated herein by reference.

As already noted, during operation of a machine underground, material may fall off the walls of the mine, thereby possibly creating a hazardous condition for the operator. To provide operator protection, the machine 10 includes a protective shield 66. The protective shield 66 substantially covers at least one exposed side of the operator station 50 (the left side in FIG. 2) to protect the operator during operation of the machine 10.

Referring now in particular to FIGS. 3a and 3b in conjunction with FIGS. 1 and 2, the protective shield 66 is in the form of a curtain including a set of elongated members 74. The operator is able to see and reach through the curtain 66, if needed. And as more fully explained below, some or all of the curtain 66 can be easily removed when needed to permit the operator to access the side of the machine 10, if necessary.

The elongated members may be of many different kinds and types of material suitable for use according to the principles of the present invention. In the preferred embodiment, the elongated members 74 are chains including alternating, perpendicular, interconnected linked members in the form of chain links 94. The chains may be of many different types of chain, but galvanized, grade 30, ½-inch proof coil chain is preferred. For reasons that will be more apparent below, each chain 74 is connected to an adjacent chain 74 with a chain connector 103 thereby partially increasing the stability of the protective shield 66 by forming a chain mesh. Although various chain connectors may be used, wide jaw, zinc plated, ½ inch threaded chain connectors are preferred.

The protective shield 66 extends between a top curtain bracket 86, which is mounted on the canopy extension 62, and a bottom curtain bracket 90, which is mounted on the deck extension 54. If the canopy extension 62 or deck extension 54 is omitted, the brackets 86 and 90 can be connected directly to the canopy or deck. The brackets can be made of any number of different materials, but steel is preferred.

The lowermost link 94 of each chain 74 is attached to the bottom curtain bracket 90 by a respective chain connector 105, which passes through a respective hole 112 in the bottom bracket 90. Although various connectors may be used, standard jaw, zinc plated, 9/16 inch threaded chain connectors are preferred.

Figure 4:
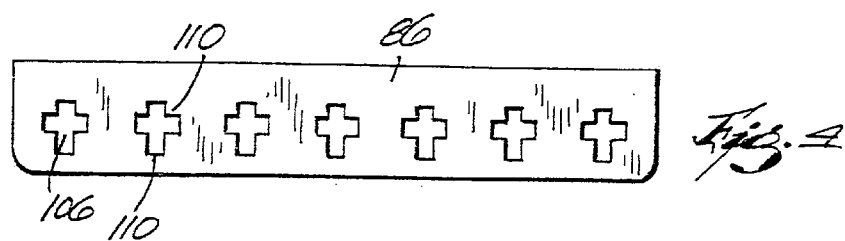
FIG. 4 is an enlarged portion of FIG. 3b showing in greater detail a top curtain bracket of the machine. The curtain bracket is designed to receive and to support one end of the protective shield.

With additional reference to FIG. 4, the upper end of each chain 74 is connected to the upper curtain bracket 86 by passing the chain 74 through a respective slotted opening 106 in the bracket 86. Each opening 106 includes a pair of perpendicular slots 110 (one horizontal and one vertical) sized to allow the chain links 94 of the associated chain 74 to pass through the opening 106. After the chain 74 is pulled through the opening 106 so that the chain 74 is generally taut, although flexible enough to allow the operator to move the chain 74 as desired, the chain 74 is released so that one of the last two links 94 pulled through the opening 106 catches on the bracket 86, in the lower portion of the vertical slot 110, due to the force of gravity. This substantially prevents the chain 74 from moving further out of the opening 106, and thus keeps the chain 74 suspended from the bracket 86, unless the chain 74 is manually removed from the opening 106. When desired, more or less of the length of the chains 74 may be pulled through the slots 110 of the upper curtain bracket 86, thus shortening or lengthening the curtain 66. Further, some or all of each of the tops of the chains 74 may be removed from the slots 110, if desired, to permit the operator to have access to the side of the machine 10.

The ability of the length of the chains 74 to be shortened or lengthened with respect to the frame 14 provides the protective shield 66 with an adjustable height. The chains 74 are flexible in relation to one another so as to allow the operator to easily reach and see through the protective shield 66 whenever such action is desired. The chains 74 can be manually handled without the use of additional tools to adjust the protective shield 66 as desired.

Referring again to FIGS. 3a and 3b, each chain 74 preferably includes a spring mechanism 120 interposed or extending between a pair of chain links 94 between the brackets 86 and 90. Although various spring mechanisms may be used according to the principles of the present invention, a heavy-duty, stainless steel safety draw bar extension spring is particularly suitable for use. Such devices, which are well known in the art, include two overlapping brackets or members 124 capturing a spring 128 such that the spring 128 is compressed when the mechanism extends. The spring mechanisms 120 enable the chain curtain 66 to better absorb the impact caused by debris hitting the shield 66. Moreover, the spring-like nature of the shield 66 provided by the spring mechanisms 120 helps prevent damage to the chains 74 or chain links 94 if the operator inadvertently over-extends the height of the canopy 58.

As an additional safety feature, the first link 94 of the end portion of each chain 74 (the portion that has been passed through the slot 106) is preferably connected to one of the links 94 of the main portion of the chain 74 (the portion extending between the brackets 86 and 90) with a connector, such as a chain connector 103. This substantially prevents the chain 74 from being inadvertently pulled out of the slot 106 and also substantially prevents the end portion of the chain 74 from freely swinging in an uncontrolled manner during operation of the machine 10. It is important that the end portion of the chain 74 be connected to the main portion of the chain with enough slack in the end portion so that the spring mechanism 120 is allowed to extend to its full extent.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. For example, it is envisioned that the protective shield could suspend from the frame or canopy without the need for securing the bottom end of the protective shield to the frame or other bracket. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A machine used in connection with underground mining comprising:
   a frame;
   an operator station on said frame for supporting an operator during operation of said machine, said operator station having an exposed side; and
   a protective shield supportable by said frame so as to substantially cover said exposed side of said operator station to protect the operator during operation of said machine, said protective shield having an adjustable height and a set of elongated members defining a flexible curtain, each elongated member including a plurality of linked members, and
   a canopy supported by said frame and extending over said operator station, and wherein said plurality of linked members of each elongated member comprises alternating, perpendicular, interconnected chain links such that each elongated member comprises a chain, and wherein said canopy includes a top curtain bracket having therein a respective slotted opening for each chain, each slotted opening including a pair of perpendicular slots, such that said chain links of the associated chain are passable through the respective slotted opening.

2. A machine according to claim 1, wherein at least a portion of said protective shield is removable from and reattachable to said machine without the use of additional tools.

3. A machine according to claim 1, further comprising a canopy supported by said frame and extending over said operator station, such that at least one of said linked members of each elongated member is attachable to said canopy.

4. A machine according to claim 3, wherein said canopy includes a top curtain bracket, and wherein said frame includes a bottom curtain bracket, such that at least one of said linked members of each elongated member is attachable to said top curtain bracket and at least another one of said linked members of each elongated member is attachable to said bottom curtain bracket.

5. A machine according to claim 1, wherein at least one of said chain links of each chain is positionable in one of said perpendicular slots of the respective slotted opening so as to prevent withdrawal of the chain from the respective slotted opening.

6. A machine according to claim 5, wherein the force of gravity causes one of said chain links of each chain to be positioned in one of said perpendicular slots of the respective slotted opening so as to prevent withdrawal of the chain from the respective slotted opening.

7. A machine according to claim 5, wherein one of said chain links of each chain is connected to a respective chain connector, and wherein said frame includes a bottom curtain bracket having a respective hole there through for each chain, such that the chain connectors connected to the associated chain are attachable to the respective hole so as to further secure the chains to said machine.

8. A machine according to claim 7, wherein each chain is connected to an adjacent chain with a chain connector, thereby increasing the stability of said protective shield.

9. A machine according to claim 7, wherein each chain includes a spring mechanism interposed between two of said chain links between said top curtain bracket and said bottom curtain bracket.

10. A machine according to claim 1, wherein said operator station further includes another exposed side, and wherein said machine further comprises another protective shield supportable by said frame so as to substantially cover the other exposed side of said operator station to protect the operator during operation of said machine, the other protective shield also having an adjustable height.

11. A machine comprising:

a frame;

an operator station on said frame for supporting an operator during operation of said machine, said operator station having an exposed side;

a canopy supported by said frame and extending over said operator station; and a protective shield supportable by said frame so as to substantially cover said exposed side of said operator station to protect the operator during operation of said machine, wherein said protective shield includes a set of elongated members defining a flexible curtain, and wherein each elongated member includes a plurality of linked members, and wherein said plurality of linked members of each elongated member comprises alternating, perpendicular, interconnected chain links such that each elongated member comprises a chain, and wherein said canopy includes a top curtain bracket having therein a respective slotted opening for each chain, each slotted opening including a pair of perpendicular slots, such that said chain links of the associated chain are passable through the respective slotted opening, and wherein at least one of said chain links of each chain is positionable in one of said perpendicular slots of the respective slotted opening so as to prevent withdrawal of the chain from the respective slotted opening.

12. A machine according to claim 11, wherein said protective shield includes opposite ends, such that one end of said protective shield is attachable to said frame and the other end of said protective shield is attachable to said canopy, wherein said protective shield is removable from and reattachable to at least one of said frame and said canopy without the use of additional tools.

13. A machine according to claim 11, wherein at least one of said linked members of each elongated member is attachable to said canopy.

14. A machine according to claim 13, wherein said canopy includes a top curtain bracket, and wherein said frame includes a bottom curtain bracket, such that at least one of said linked members of each elongated member is attachable to said top curtain bracket and at least another one of said linked members of each elongated member is attachable to said bottom curtain bracket.

15. A machine according to claim 11, wherein the force of gravity causes one of said chain links of each chain to be positioned in one of said perpendicular slots of the respective slotted opening so as to prevent withdrawal of the chain from the respective slotted opening.

16. A machine according to claim 15, wherein each chain is connected to an adjacent chain with a chain connector, thereby increasing the stability of said protective shield.

17. A machine according to claim 11, wherein one of said chain links of each chain is connected to a respective chain connector, and wherein said frame includes a bottom curtain bracket having a respective hole there through for each chain, such that the chain connectors connected to the associated elongated member are attachable to the respective hole so as to further secure the chains to said machine.

18. A machine according to claim 17, wherein each chain includes a spring mechanism interposed between two of said chain links between said top curtain bracket and said bottom curtain bracket.

19. A machine according to claim 11, wherein said operator station further includes another exposed side, and wherein said machine further comprises another protective shield supported by said frame so as to substantially cover the other exposed side of said operator station to protect the operator during operation of said machine, the other protective shield also including a set of elongated members defining a flexible curtain through which the operator can reach and see.

20. A machine comprising:

a frame;

an operator station on said frame for supporting an operator during operation of said machine, said operator station having an exposed side;

a protective shield supportable by said frame so as to substantially cover said exposed side of said operator station to protect the operator during operation of said machine, said protective shield including a set of chains defining a flexible curtain through which the operator can reach and see, each chain including alternating, perpendicular, interconnected chain links; and a canopy supported by said frame and extending over said operator station, wherein said canopy includes a top curtain bracket having therein a respective slotted opening for each chain, each slotted opening including a pair of perpendicular slots, such that said chain links of the associated chain are passable through the respective slotted opening, wherein at least one of said chain links of each chain is positionable in one of said perpendicular slots of the respective slotted opening so as to prevent withdrawal of the chain from the respective slotted opening, and wherein said at least one of said chain links of each chain which is positioned in one of said perpendicular slots of the respective slotted opening is also removable therefrom such that at least another one of said chain links of each chain is positionable in one of said perpendicular slots of the respective slotted opening so as to prevent withdrawal of the chain from the respective slotted opening thereby enabling said protective shield to have an adjustable height, said chains being handled and positioned without the use of additional tools.

21. A machine according to claim 20, wherein each chain includes a spring mechanism interposed between two of said chain links between said top curtain bracket and said bottom curtain bracket.

* * * * *